No. 747,842. PATENTED DEC. 22, 1903.
G. BAEHR.
ELECTRIC APPARATUS FOR WELDING TUBES.
APPLICATION FILED JAN. 31, 1902.
NO MODEL. 3 SHEETS—SHEET 1.

Witnesses: Inventor:
George Baehr
By Ray & Totten
Attorneys.

No. 747,842. PATENTED DEC. 22, 1903.
G. BAEHR.
ELECTRIC APPARATUS FOR WELDING TUBES.
APPLICATION FILED JAN. 31, 1902.
NO MODEL. 3 SHEETS—SHEET 2.

Witnesses: Inventor:
George Baehr
By Kay & Totten
Attorneys.

No. 747,842. PATENTED DEC. 22, 1903.
G. BAEHR.
ELECTRIC APPARATUS FOR WELDING TUBES.
APPLICATION FILED JAN. 31, 1902.
NO MODEL. 3 SHEETS—SHEET 3.
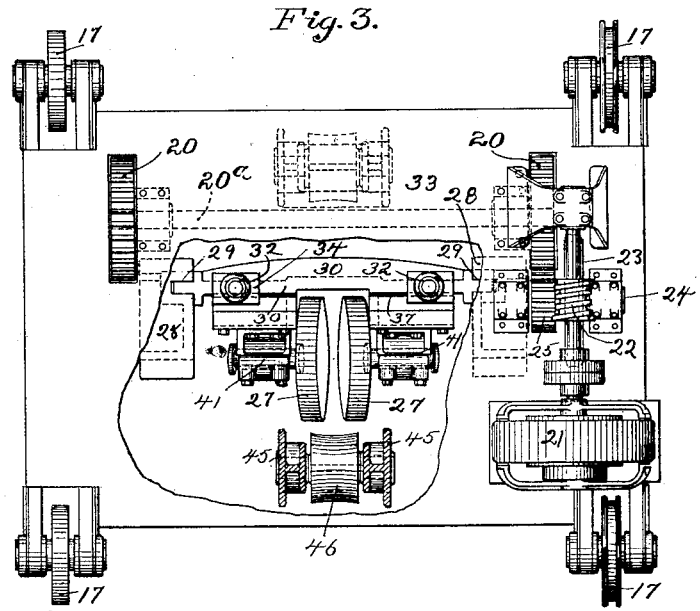
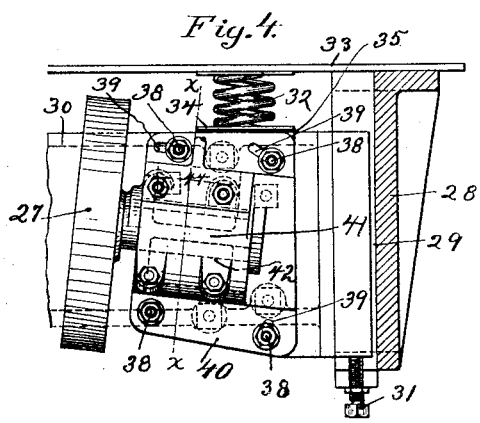
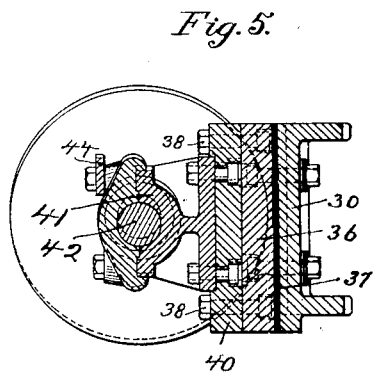
Witnesses:
Walter Tamasier
Fred L. Sweet
Inventor:
George Baehr
By Kay & Totten
Attorneys.

No. 747,842. Patented December 22, 1903.

UNITED STATES PATENT OFFICE.

GEORGE BAEHR, OF McKEESPORT, PENNSYLVANIA, ASSIGNOR TO NATIONAL TUBE COMPANY, OF PITTSBURG, PENNSYLVANIA, A CORPORATION OF NEW JERSEY.

ELECTRIC APPARATUS FOR WELDING TUBES.

SPECIFICATION forming part of Letters Patent No. 747,842, dated December 22, 1903.

Application filed January 31, 1902. Serial No. 92,034. (No model.)

*To all whom it may concern:*

Be it known that I, GEORGE BAEHR, a resident of McKeesport, in the county of Allegheny and State of Pennsylvania, have invented a new and useful Improvement in Electric Apparatus for Welding Tubes; and I do hereby declare the following to be a full, clear, and exact description thereof.

My invention relates to apparatus for welding tubes electrically, and more especially to apparatus for butt-welding longitudinal joints in such tubes.

In all forms of apparatus prior to my invention for welding longitudinal joints in pipes and tubes the pipe or tube blank has been moved longitudinally past the heating and welding apparatus in order to progressively weld the joint thereof. In the welding of large-sized tubes, pipes, cylinders, and the like difficulty has been experienced by reason of the size and weight of such articles, which have made it difficult to properly hold the same and to move it past the heating and welding appliances.

The object of my invention is to overcome these difficulties and to provide apparatus for butt-welding longitudinal joints in large-sized tubes, pipes, and cylinders, whereby the article can be securely held in the proper position with its edges abutting and have the edges welded together.

To this end it comprises suitable supporting, holding, and clamping means for the tube-blank and electric heating and welding apparatus, which is self-propelling and arranged to move along such tube-blank and to progressively heat and effect the welding together of the abutting edges of said blank.

Figure 1:
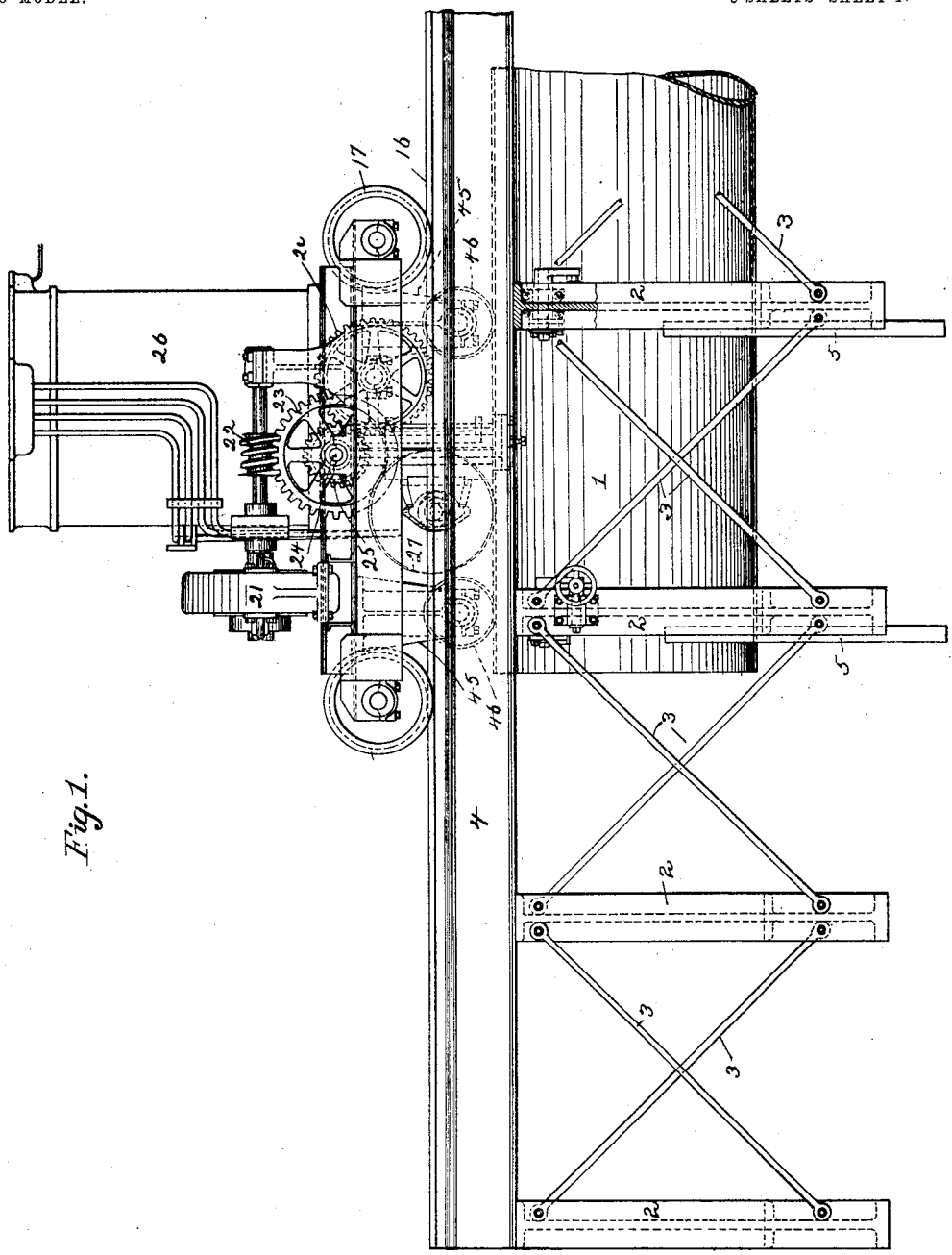
Figure 2:
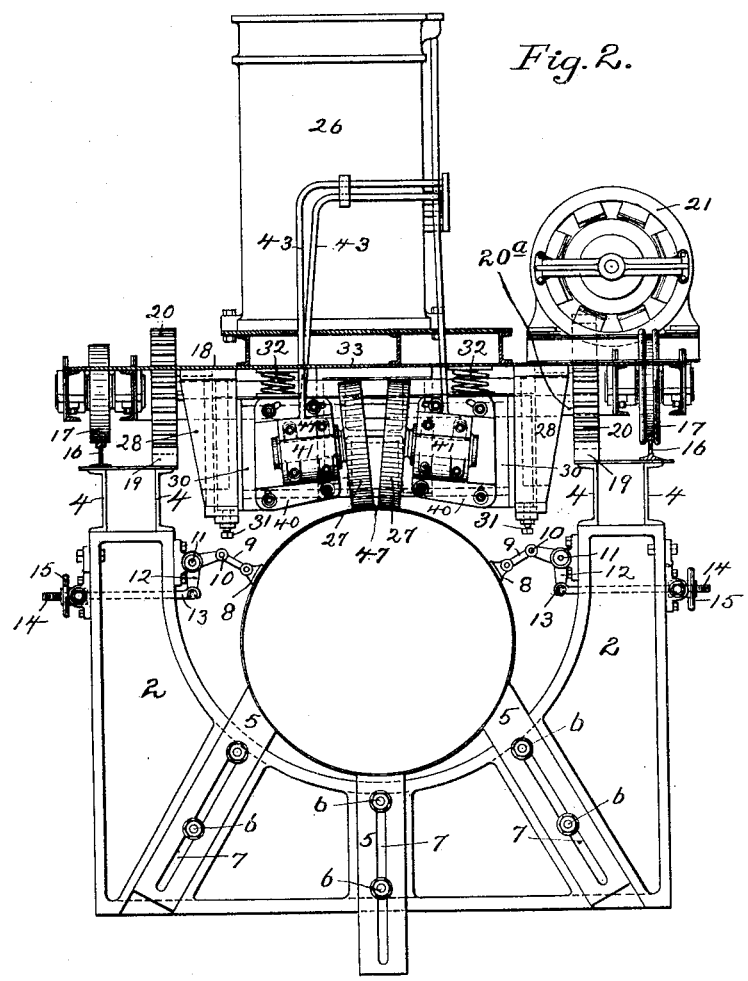

In the accompanying drawings, Figure 1 is a side elevation of my apparatus. Fig. 2 is an end elevation thereof, partly in section. Fig. 3 is a top view of the carriage, parts being broken away. Fig. 4 is a transverse sectional detail showing the manner in which the contact-rolls are supported, and Fig. 5 is a detail section of the same on the dotted line $x\ x$ on Fig. 4.

In the drawings the numeral 1 represents the tube, pipe, or cylinder to be welded, and in my apparatus it is held stationary, with its edges abutting. Various forms of supporting or holding means therefor may be employed, and that shown in the drawings is largely illustrative, as other means suitable for such purpose will readily suggest themselves. The supporting and holding means shown comprise the frames or housings 2, united by the brace-rods 3 and having secured to their tops the longitudinal beams 4. The housings or frames 2 are U-shaped on their upper sides, as shown in Fig. 2, for receiving the tube or pipe 1, and to accommodate different sizes of pipes or tubes suitably-adjustable supports must be provided, those shown comprising slides 5, mounted in suitable guideways in the housings or frames 2 and adjustable up and down by any suitable means, such as the bolts 6, engaging slots 7 in the slides or in the housings, as preferred. The upper ends of these slides are suitably shaped to fit the contour of the pipe or cylinder. Suitable means must also be provided for holding the abutting edges of the tube or cylinder in contact, and for this purpose also various means may be employed. The means shown comprise clamps 8, mounted on the ends of the arms 9, which are preferably jointed, as at 10, so that the inner end of the arm may be set at an angle to the outer end thereof in order to bring the faces of the clamps 8 squarely against the face of the tube or cylinder. These clamping-arms are suitably pivoted to the housings or frames 2, as at 11, and are provided with the arms 12, which are engaged by hooks 13 on the end of the rods 14, which project to the outside of the frames or housings and are threaded on their outer ends to receive a threaded hand-wheel 15 or similar device, by means of which the clamps 8 may be set firmly against the tube or cylinder. In order that the clamping-arms 9 will not be in the way when placing a tube-blank in the apparatus or removing the tube therefrom, it is necessary that the rod 14 be readily detachable from the arm 12, so that the clamping-arms 9 can be thrown out of the way, and such readily detachable connection is furnished by the hook 13 on the end of the rod 14, although other means for this purpose will suggest themselves. The pivot 11 of the various clamping-arms on each side of the machine may, if desired, be united to a rock-shaft running the entire length of the machine, or at least half the length thereof, and only a single rod 14 and hand-wheel 15 be used in connection therewith, so that all of the clamps on one side of the machine can, if desired, be operated from one place.

On the top of the beams 4 I provide suitable tracks, such as the rails 16, upon which travel the wheels 17 of a carriage 18, on which the welding apparatus is mounted. This carriage, with the welding apparatus, is designed to travel along the frame to progressively weld the joint in the pipe or cylinder blank. Preferably I form the supporting-frame of sufficient length to accommodate two lengths of pipe or cylinder, so that while the joint of the tube-blank at one end of the machine is being welded the workman can be removing a previously-welded tube from the other end of the machine and introducing in its place another tube-blank to and upon which the welding apparatus can be taken and made to operate as soon as the welding of the first-mentioned joint has been completed. The frame, however, may be made long enough to hold even more than two lengths of pipe or need be only long enough to hold a single length of pipe.

The carriage 18, carrying the welding apparatus, may be propelled along the frame in any suitable manner or by any suitable means. I prefer to use automatic mechanism for this purpose, that shown comprising racks 19, secured to the beams 4 and engaged by gears 20, secured to a shaft 20$^a$, extending transversely of the carriage. Mounted on one side of the carriage is a motor 21, the armature-shaft of which is provided with a worm 22, gearing with a worm-wheel 23 on a short counter-shaft 24, to which counter-shaft is secured a pinion 25, which meshes with the gear 20 on that side of the machine. Any other suitable train of gearing, however, between the motor and shaft 20$^a$ may be employed.

The motor 21 may be supplied with current from any convenient source and in any convenient manner—as, for instance, by being connected by a flexible cable to a suitable source of current or by having two trolleys or brushes running on wires connected to a source of electricity, or it may be supplied by a current from the transformer 26, which is mounted on the carriage. When thus organized, I designate the traveling apparatus a "locomotive-welder"—that is, a traveler having its propelling mechanism mounted thereon, thereby dispensing with stationary moving means, as in prior devices, and making the device capable of welding tubes of any length. The transformer affords the current for heating the tube or cylinder to be welded, and it is supplied with current by any convenient means, such as trolleys or a flexible cable. A shunt from the trolleys or flexible cable may, if desired, be connected to the motor 21.

Any convenient current-conducting means may be used for applying the current to the tube on the opposite sides of the joint to be welded, so that the current will pass across said joint and heat the same, when the expansion of the metal due to the heat, together with the thrusts due to the pressure of the clamps 8 on the tube, will cause the edges to weld together. I prefer, however, to use suitable contact-rollers, such as the rollers 27, which bear on opposite sides, respectively, of the tube-joint, as shown. These rollers may be mounted on the carriage 18 in a variety of ways. As shown, the carriage 18 has secured to its lower side two depending brackets 28, which are provided with vertical guideways or grooves 29 for receiving the ends of a transverse beam or girder 30, upon which the contact-wheels 27 are mounted. Suitable adjusting-screws 31 are provided for limiting the downward movement of the beam, said beam being freely movable upward to accommodate tubes of different sizes. In order to hold the contact-rollers against the tube, I provide suitable pressure devices, such as the spiral springs 32, which are interposed between the top plate 33 of the carriage and suitable plates 34, resting on the beam or girder 30, but insulated therefrom, as by the layer of insulation 35. To the beam 30 on each side of the longitudinal axis of the carriage is suitably secured a fixed plate 36, which is insulated from the beam 30 by the layer of insulation 37. To this fixed plate 36 are secured the inner ends of bolts 38, which project through slots 39 in the swivel-plate 40 and secure the latter to the plate 36. Secured to the swivel-plate 40 are bearings 41 for the shafts 42 of the contact-rollers 27. In order to properly heat the edges of the tube, it is necessary to pass a current of large volume across the tube-joint. Hence it is desirable that the rollers 27 bear squarely against the outer face of the tube. For this reason the rollers must be adjusted angularly to bring their faces squarely against tubes of various sizes. This adjustment is permitted by the slots 39.

The current from the transformer is conducted, by means of the cables 43, to contact-plates 44, suitably secured to the bearings 41 or other convenient part of the roller-carrying frame; but as this roller-carrying frame is insulated by the insulation 37 from the beam 30 the current cannot short-circuit through the frame of the machine, but must pass from one of the rolls across the tube-joint to the other of said rolls. The transformer, it will be understood, is used for transforming a high-tension current into one of large amperage, which is necessary in order to get the best heating effect of the current.

I also preferably provide the carriage 18, both in front of and in the rear of the contact-rollers 27, with a pair of depending brackets or bearings 45, in which are mounted rollers 46, which bear upon the tube-joint. The forward one of said rollers presses the edges of the tube-blank down, so that both edges will be on the same level, and the rear one of said rollers aids in this purpose and also smooths down any burs or fins that may be formed. It will be observed that the wheels 17 on one side of the carriage are grooved, and said wheels straddle the rail 16, thus preventing the carriage from running off the track. The wheels on the opposite side of the carriage may be grooved likewise, if desired; but to reduce friction and to reduce the cost of said wheels they are preferably formed with plain faces, as shown.

The operation of the apparatus is as follows: The tube-blank 1 to be welded is confined between the clamps 8 and the supporting-slides 5, the latter being raised or lowered, according to the size of the tube, so as to bring the joint 47 of the tube-blank to the proper height with relation to the contact-rolls 27. The clamps 8 are firmly pressed against the tube-blank, so as to hold the edges thereof in close contact. Current is supplied to the transformer and motor by the means above described and the motor by means of the gearing shown and the gears 20, which engage the racks 19, will propel the carriage along the frame, the direction depending upon the position of the controlling-switch for the motor. At the same time the current in the secondary of the transformer 26 passes down through one of the contact-rollers 27, across the tube-joint, and out by means of the other contact-roller, thereby progressively heating the longitudinal edges of the tube or cylinder blank, when the pressure at the joint due to the influence of the clamps 8 will firmly weld the abutting edges together. The springs 32 will hold the contact devices 27 firmly against the tube, thereby insuring a good contact at all times.

When a smaller-sized tube or cylinder than that shown is to be welded, the slides 5 must be elevated in order to support the tube-blank at the proper height with reference to the contact-rollers, and the swivel-plates 39 must be turned so as to support the contact-rollers 27 at a greater angle from the vertical than shown in order that the faces of said rolls may bear squarely against the surface of the tube-blank.

It will be observed that no handling or movement of the tube or cylinder blank is necessary during the welding operation, so that it is possible to hold said tube-blank with the edges accurately in place and with sufficient pressure on the edges to insure their welding when heated.

What I claim as my invention, and desire to secure by Letters Patent, is—

1. In apparatus for welding tubes, the combination of suitable stationary supporting and holding means for the tube-blank, and a locomotive electric welder for effecting the progressive welding together of the abutting edges of said tube-blank.

2. In apparatus for welding tubes, the combination with a suitable frame, of pressure-clamps arranged to bear against the tube-blank above its longitudinal center for holding the same therein and pressing its abutting edges against each other, and means arranged to travel along the tube-blank and heat the abutting edges thereof, whereby they will be welded together.

3. In apparatus for welding tubes, the combination with a suitable frame, of adjustable supports and clamps therein arranged to bear against the tube-blank above its longitudinal center for holding the same and pressing its abutting edges against each other, and means arranged to travel along the tube-blank and heat the edges thereof, whereby they will be welded together.

4. In apparatus for welding tubes, the combination with a suitable supporting-frame, of clamping-arms adapted to bear against the tube-blank above its longitudinal center and press the edges thereof together, means for actuating said arms, detachable connections between said means and said arms, suitable means for heating said edges to a welding heat, and mechanism for moving said heating means along the tube.

5. In apparatus for welding tubes electrically, the combination with suitable stationary supporting and holding means for the tube-blank, a traveling carriage, a motor on said carriage for moving it along the tube-blank, and electric contact devices on said carriage adapted to bear on opposite sides of the tube-joint.

6. In apparatus for welding tubes electrically, the combination with suitable stationary supporting and holding means for the tube-blank, of a traveling carriage, a transformer and motor mounted on said carriage, said motor being connected to move the carriage along the tube-blank, electric contact devices also mounted on the carriage and adapted to bear on the opposite sides of the tube-joint, and connections between the transformer and contact devices.

7. In apparatus for welding tubes, the combination with a suitable frame, of supporting and clamping means for the tube-blank in said frame, a traveling carriage mounted to travel along on said frame, a motor on said carriage, rack and gear connections between said motor and said frame for moving the carriage along the frame, and welding apparatus mounted on said carriage.

8. In apparatus for welding tubes electrically, the combination with suitable supporting and holding means for the tube-blank, of a traveling carriage arranged to travel along said tube, a cross-beam thereon, contact-rollers adapted to bear on opposite sides of the tube-joint, and bearings for said rollers mounted on but insulated from the cross-beam.

9. In apparatus for welding tubes electrically, the combination with suitable stationary supporting and holding means for the tube-blank, means for adjusting said supporting and holding means to accommodate tubes of different sizes, electric contact and pressure devices adapted to bear on opposite sides of the tube-joint, mechanism for moving said contact devices along the tube-blank, and means for holding said contact devices yieldingly against the tube.

10. In apparatus for welding tubes electrically, the combination with suitable stationary supporting and holding means for the tube-blank, of means for adjusting the same to accommodate tubes of different sizes, of electric contact devices adapted to bear on opposite sides of the tube-joint, a vertically-movable support on which said contact devices are mounted and from which they are insulated, springs for pressing said support toward the tube, and mechanism for moving said support along the tube.

11. In apparatus for welding tubes electrically, the combination with suitable supporting and holding means for the tube-blank, of electric contact-rollers adapted to bear on opposite sides of the tube-joint, an insulated supporting-plate, a plate secured thereto and adjustable angularly thereon, and bearings for the rolls on said last-named plate.

In testimony whereof I, the said GEORGE BAEHR, have hereunto set my hand.

GEORGE BAEHR.

Witnesses:
J. A. CAUGHEY,
W. H. SIGNET, Jr.